United States Patent [19]

Wattenbarger

[11] 4,076,968
[45] Feb. 28, 1978

[54] TELEPHONE RINGER INTENSITY CONTROL RESPONSIVE TO AMBIENT NOISE

[75] Inventor: Blake Lane Wattenbarger, Fair Haven, N.J.

[73] Assignee: Bell Telephone Laboratories, Incorporated, Murray Hill, N.J.

[21] Appl. No.: 719,909

[22] Filed: Sep. 2, 1976

[51] Int. Cl.² .............................................. H04M 1/26
[52] U.S. Cl. ................................ 179/84 R; 179/84 T
[58] Field of Search ................ 179/84 R, 84 T, 81 R, 179/1 A, 1 MN, 1 P, 1 VL, 1 C, 2 C, 2 R; 340/328

[56] References Cited

U.S. PATENT DOCUMENTS

| | | | |
|---|---|---|---|
| 2,428,007 | 9/1947 | Boardman | 340/328 |
| 2,575,990 | 11/1951 | Augustadt | 179/1 P |
| 3,171,901 | 3/1965 | Clemency | 179/81 B |
| 3,290,442 | 12/1966 | Suganuma | 179/1 P |
| 3,387,097 | 6/1968 | Beadle | 179/84 T |
| 3,934,084 | 1/1976 | Munson | 179/1 P |

Primary Examiner—Kathleen H. Claffy
Assistant Examiner—Joseph A. Popek
Attorney, Agent, or Firm—Roy C. Lipton

[57] ABSTRACT

The loudness of a telephone set ringer is controlled by audible ambient noise in the vicinity of the telephone set to match the ringer intensity level to the ambient noise level. During an on-hook state of the telephone set, the transmitting microphone is utilized to detect the ambient noise which is then utilized to control the loudness of the ringer. In one illustrative embodiment, ring bursts which contribute to the ambient noise level cause build-up of ringer intensity starting at a level appropriate to the initial ambient noise level. In another embodiment, noise detection is terminated when the set is rung to maintain ringer intensity at the same level.

10 Claims, 8 Drawing Figures

TELEPHONE RINGER INTENSITY CONTROL RESPONSIVE TO AMBIENT NOISE

FIELD OF THE INVENTION

This invention relates to telephone station control systems and, more particularly to automatic control of call alerting equipment contained therein.

DESCRIPTION OF THE PRIOR ART

Telephone ringers are designed to produce an alerting signal for the purpose of informing a user of an incoming call. In an environment such as mobile telephone large variations in ambient noise level exist. The alerting signal must be loud enough to attract the user's attention in the noisiest of environments; whereas a high level alerting signal may be too loud for quieter environments, especially if the user is immediately adjacent the telephone set. A telephone ringer loudness control is usually provided so that the user can adjust the level to suit his needs. However, the setting is static; it is the same for every call, regardless of moment to moment changes in the noise level in the area of the telephone set. The user must set the level higher than he would prefer for the normal situation or risk missing calls that occur under noisier conditions.

It is known in the art to arrange an alerting signal to build up in volume from an initially low value to full volume over a period of time. If this period of time is short, alerting commences at substantially full volume; if this period of time is long, however, the alerting signal may not be loud enough to be recognized before a caller abandons has attempt.

It is therefore a broad object of this invention to rapidly alert a telephone user of an incoming call without commencing at full volume in quiet environments.

It is another object of this invention to provide economical and inexpensive alerting equipment which is effective in the presence of ambient noise.

SUMMARY OF THE INVENTION

In accordance with this invention the audible alerting signal commences at a loudness level appropriate to the ambient noise level and thereafter increases in response to its own contribution to the level of audible sounds. More specifically, the loudness level of the audible alerting signal is regulated in accordance with the audible sounds external to the telephone set.

In accordance with a feature of this invention, a transmitting microphone of the telephone set is utilized during the on-hook state for detecting the ambient noise and converting the noise to output signals which regulate the ringing level.

In accordance with one embodiment of this invention, the contributions of the audible alerting signal to the ambient noise level cause an increase in the loudness of the alerting signal. More specifically, the audible sounds are converted into signals which are averaged over a time interval of a plurality of ring bursts whereby the converted signal level is determined by both the ambient noise and the ring bursts within the time interval.

In accordance with another embodiment of this invention, the loudness of the alerting signal is dependent upon the ambient noise level and is rendered independent of the ring signal. More specifically, the transmitting microphone output, which is utilized in measuring the ambient noise level, is blocked when the calling party rings; hence the level of the alerting signal is determined solely by the audible ambient noise prior to the commencement of ringing.

The foregoing and other objects and features of this invention will be more fully understood from the following description of illustrative embodiments taken in conjunction with the accompanying drawings.

DETAILED DESCRIPTION

Figure 1:
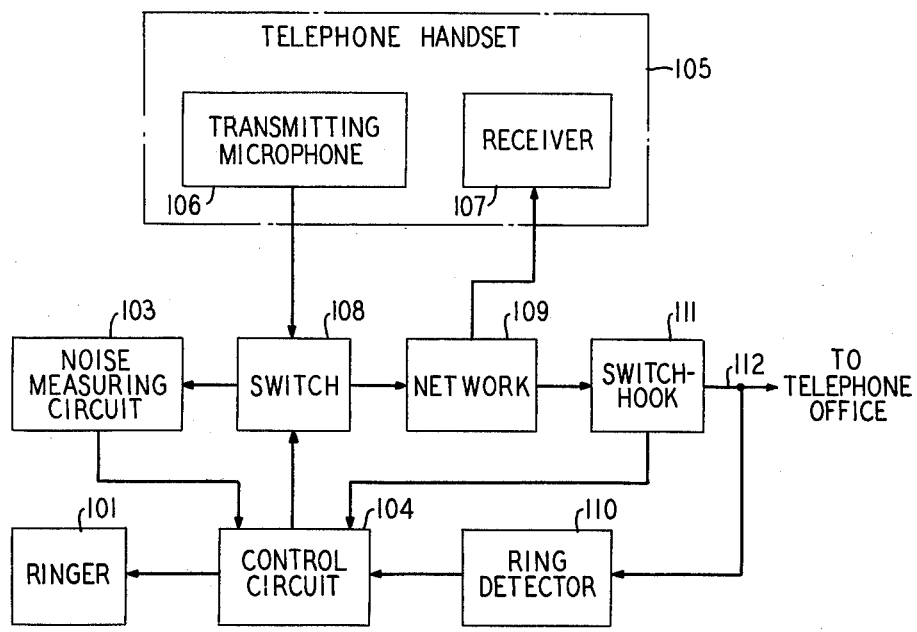
FIG. 1 discloses, in block form, a telephone set arranged in accordance with this invention.

A telephone set having a ringer with a loudness control responsive to ambient noise is shown in the block diagram of FIG. 1. Telephone ringer 101 is a conventional ringer which emits an audible alerting sound to attract the attention of a user when an incoming call arrives. The intensity or loudness level at which the ringer operates is regulated by control circuit 104. It is well known that, when ringer 101 is a conventional bell, a manually operable damper (not shown) may be available therein for adjusting its loudness. Resistors in series or in shunt with a winding of the bell may be switched in to additionally vary the loudness level and thereby provide control beyond the manual static adjustment.

When the ringer is of the so-called tone ringer variety, electronic circuitry and a loudspeaker are included within ringer 101. An alerting signal, typically a composite of two tones, is delivered to the loud-speaker. Manual and automatic control of the tone ringer signal intensity is discussed in connection with FIG. 2.

In FIG. 1, telephone handset 105 comprises conventional transmitter 106 and receiver 107. The transmitter is utilized during an "off-hook" state of the telephone set for voice communications over switch 108, network 109, switchhook 111 and telephone line 112. During an "on-hook" state, control circuit 104 alters the transmission path of signals from transmitter 106. Signals now flow through switch 108 into noise measuring circuit 103 which thereby measures the level of ambient noise, external to the set, provided through microphone 106.

Ring detector 110 detects incoming ringing from a path such as telephone line 112. Control circuit 104 is responsive to the output of the ring detector for commencing the operation of ringer 101 and responsive to a signal from noise measuring circuit 103 for regulating the loudness of ringer 101. Regulation may be such that the loudness of the audible alerting signal varies continuously as the audible ambient noise; such is the case in FIG. 2. The alerting signal may, on the other hand, be increased by a discrete amount after a threshold is exceeded; such is the case in FIG. 5. Control circuit 104 may also control the input to noise measuring circuit 103 through switch 108 to thereby determine when sounds will be measured by circuit 103.

Network 109 is well known and typically includes a sidetone balancing network, a varistor to suppress clicks in the receiver and an equalizer to compensate for variations in loop length.

Figure 2:
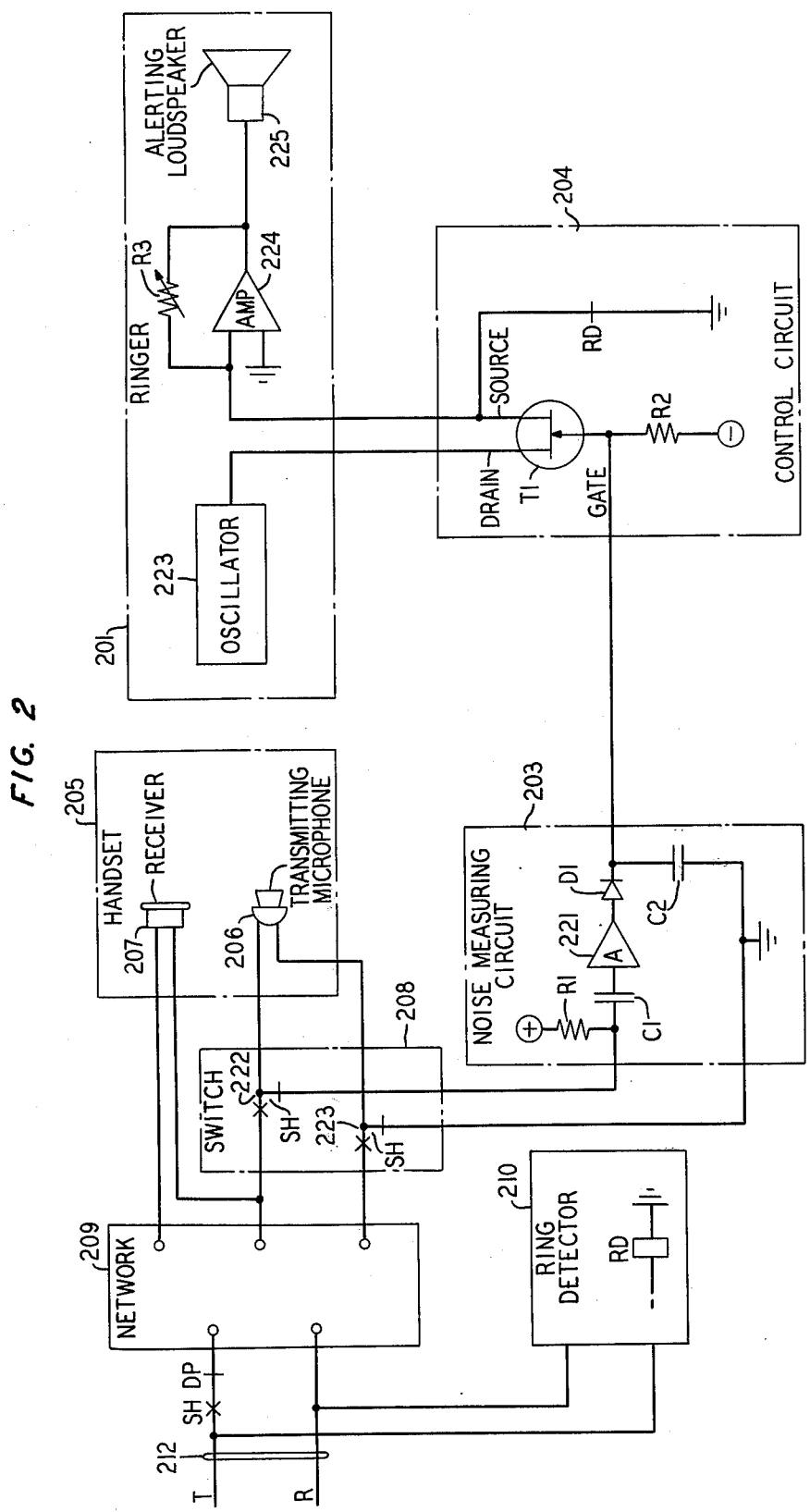
FIG. 2 shows, in schematic form, a circuit for regulating the loudness of a tone ringer in accordance with this invention.
Figure 4A:
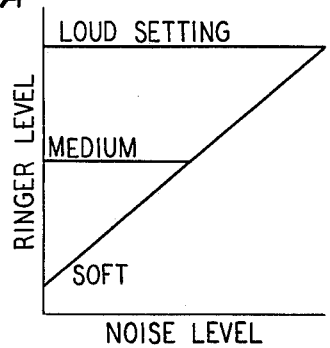
FIGS. 4A, 4B, 4C and 4D illustrate, in graphic form, alternate interrelations between audible ambient noise and ringer loudness.
Figure 4B:
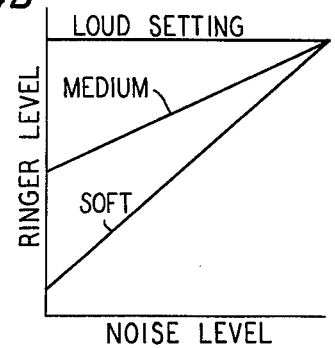
Figure 4C:
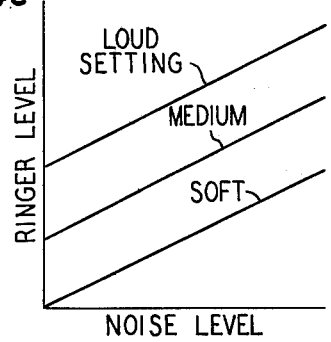
Figure 4D:
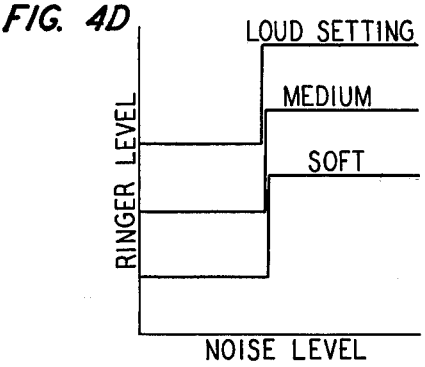

An illustrative embodiment of a tone ringer whose loudness increases continuously with the level of the audible ambient noise is shown in FIG. 2. Ringer 201 comprises oscillator 223, amplifier 224, and loudspeaker 225. Resistor R3 is manually adjustable by a user to select the minimum loudness of the loudspeaker. Control circuit 204 includes N-channel field effect transistor (FET) T1 whose resistance varies in response to its gate-to-source voltage. Initially, a negative voltage, applied via resistor R2 to the gate, keeps the FET resistance at its highest value. At this point minimum ringer loudness is encountered since the gain of operational amplifier 224 is at its minimum. As ambient noise increases, the output of noise measuring circuit 203 becomes more positive thereby decreasing the FET resistance. The gain of amplifier 224 increases and the alerting signal amplitude is thus increased.

The quiescent dc output voltage of amplifier 221 is set slightly more positive than the negative voltage to bias diode D1 at its conducting threshold. FET T1 is advantageously located at the virtual ground point of amplifier 224. At this point the signal from oscillator 223 is small and there is no dc voltage across the FET. The output impedance of the oscillator is small compared to the minimum resistance of T1.

Ring detector 210 is responsive to an incoming ringing signal such as a predetermined tone appearing across telephone line 212. The presence of such a signal is indicated by the operation of ring detector relay RD whose contacts remove shunting ground from the output of FET T1 to cause an alerting signal to be delivered to amplifier 224.

At this time transmitting microphone 206 of telephone handset 205 is connected to noise measuring circuit 203 through the normally closed switchhook contacts 222 and 223 of switch 208. Transmitter 206 is energized by a biasing current flowing through resistor R1, normally closed switchhook contact 222, transmitting microphone 206, normally closed switchhook contact 223 and ground return. A steady bias current typically between 20 and 50 milliamps is fixed by the Ohm's law relationship between the voltage supply and the cumulative impedance of resistor R1 and transmitter 206. Audible ambient noise incident upon transmitter 206 causes variations in the aforementioned current flow. These variations of the transmitter bias current are delivered to noise measuring circuit 203.

Amplifier 221 deposits current onto capacitor C2 whenever the output of the amplifier is sufficiently more positive than the voltage on capacitor C2 so as to forward bias diode D1. The effective interval during which the ambient noise is averaged is determined by the output impedance of amplifier 221 and the capacitance of capacitor C2. In the instant circuit the impedance of resistor R2 is much greater than the output impedance of amplifier 221. Resistor R2 furnishes bias voltage to the gate of transistor T1 and provides a leakage path for discharging capacitor C2 during intervals when the ambient noise is low. Capacitor C1 renders small signal amplifier 221 responsive only to variations in the bias current.

As the ambient noise level increases the gate voltage on transistor T1 also increases thereby causing the gain of amplifier 224 to increase. Thus when alerting commences, it starts at a level appropriate to the ambient noise level. No steps are taken in the instant circuit of FIG. 2 to preclude the contribution of the audible alerting signal to the measured level of ambient noise. Certain advantages are claimed for allowing the alerting signal to affect the ambient noise measurement. As the calling party continues to wait for an answer, the intensity of the ringer gradually increases and achieves a greater attention arresting quality. The circuit of FIG. 2 is arranged to increase ringer loudness as a function of time. The contribution of the individual ring bursts to the audible ambient noise is advantageously exploited by designing for a capacitor C2 charging time in the order of seconds. This renders the noise measuring circuit responsive to a plurality of ring bursts such that the net effect is an increase in audible ambient noise which causes the intensity of the ringer to build to an even louder level. Subsequent rings being louder cause the measured noise level to rise again. The operation described is that of positive feedback wherein the final ringing intensity converges to a level determined by parameters within the system.

Calling parties are generally reluctant to wait for an acknowledgment beyond eight ring bursts. The ringer intensity should be nearly maximum within that interval. Ambient noise is therefore averaged over a somewhat shorter interval to accommodate the full contribution of ring bursts to ambient noise. An averaging interval of five ring bursts is effective and is achieved with a charging time constant of two ring bursts (approximately 12 seconds). The gradual increase in ringer loudness operates in a manner so as not to be objectionable to the user who is in the vicinity of the telephone set; he will either answer the call right away or be aware that ringing is taking place and subsequent increases in ring intensity will not startle him. If the user is in another room, more noisy than the one in which ringing occurs, the increasing ring intensity will in time attract his attention.

The remaining components of FIG. 2 provide the environment in which the invention advantageously functions. Switchhook SH and dial pulse DP contacts are shown in their normal position. Network 209 may exist in a variety of designs, one of which is shown on page 70 in FIGS. 4–2 of "Transmission Systems for Communications" revised 4th edition, by Members of the Technical Staff of Bell Telephone Laboratories, copyright 1970, Western Electric Technical Publications, Winston-Salem, N.C.

Figure 3:
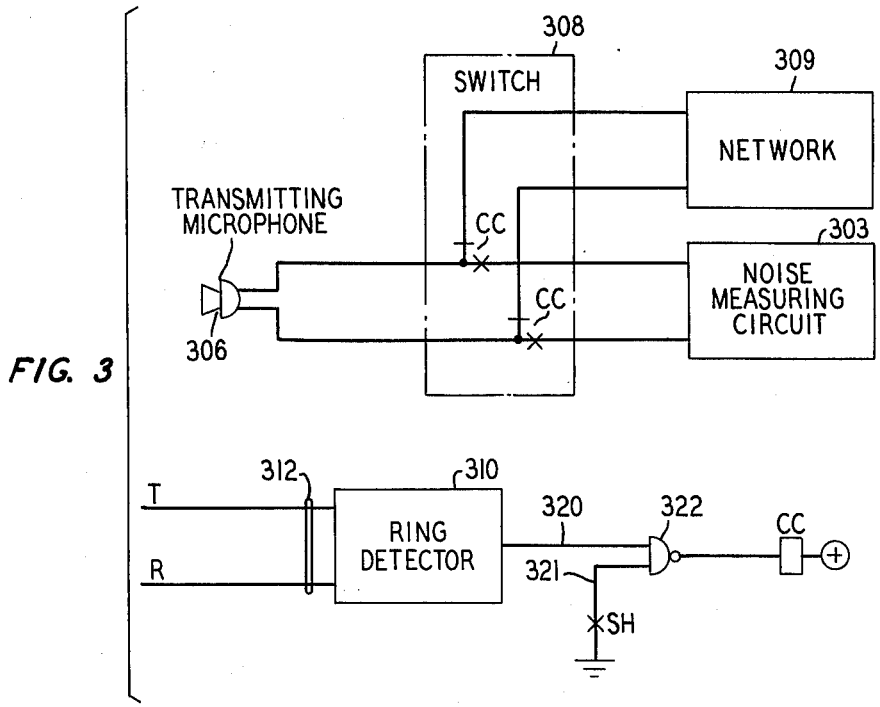
FIG. 3 shows, in schematic form, a control circuit for excluding the contribution of the audible alerting signal to audible ambient noise.

In FIG. 3, ring detector 310 is responsive to the ringing signal appearing across telephone line 312. When such a ringing signal is present, the output of ring detector 310 effectively becomes 0 volts; otherwise the output of the ring detector connected to NAND gate 322 over path 320 is a logical "1". A second input to NAND gate 322 is the state of the switchhook supplied over path 321. When the switchhook is operated, the voltage on path 321 becomes 0 volts, otherwise an open circuit condition exists which is treated as a logical "1". When both inputs to gate 322 are "1" the output is a "0" and the NAND gate provides a ground return through the relay for positive voltage; accordingly, the CC relay is operated. The relay is connected in a fail safe mode; if it fails to operate, the normal connection from the transmitter to the telephone network is preserved. When relay CC is operated, a condition that only occurs during the on-hook state of the telephone set in the absence of ringing, transmitting microphone 306 is connected to noise measuring circuit 303. Thus the contribution of the audible alerting signal to the ambient noise is precluded.

The alerting signal may be arranged to increase its intensity with ambient noise level in a number of ways, some of which are illustrated in FIG. 4. FIG. 4A illustrates how at a single ambient noise level, one of several ringer levels may exist depending upon user selection. If, for example, the user selects a medium setting, the alerting level would be of a fixed intensity until the audible ambient noise level exceeded a threshold corresponding to medium intensity alerting. Noise levels beyond that treshold would translate into proportional increases in the alerting level. FIGS. 4B and 4C demonstrate other ways in which manual and automatic settings of the ringer intensity may interact to provide a pleasing correlation between audible ambient noise and the intensity of the audible alerting signal. The aforementioned circuit of FIG. 2 operates in accordance with FIG. 4C. A very simple circuit such as shown in FIG. 5 is required to implement the characteristic depicted in FIG. 4D.

Figure 5:
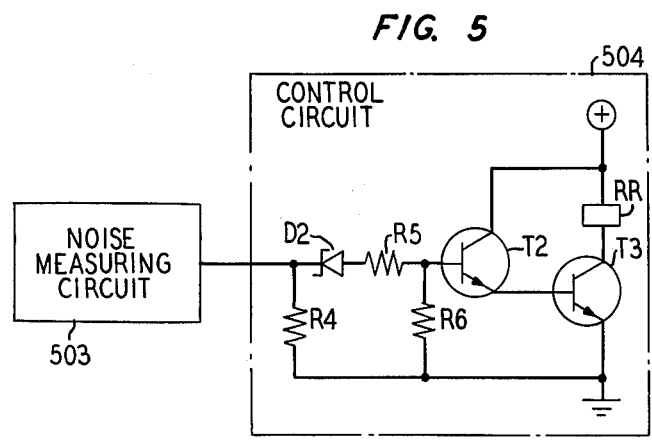
FIG. 5 shows, in schematic form, a ringer circuit for generating an audible alerting signal and a control circuit for increasing its loudness by a discrete amount.

A ringer whose loudness increases by a discrete amount when the audible ambient noise increases beyond a predetermined threshold is disclosed in the diagram of FIG. 5. Increases in ambient noise beyond this threshold do not affect telephone ringer intensity.

Control circuit 504 is responsive to the output voltage of noise measuring circuit 503. When the output voltage exceeds the sum of zener diode D2's breakdown voltage plus the base-emitter voltage drops of transistors T2 and T3, current begins to flow through resistor R5. When a sufficient amount of current flows, transistor T3 will operate relay RR. This is designed to occur when the ambient noise level is deemed sufficient to warrant an increase in ringer intensity. Selecting zener diodes with different breakdown voltages provides design control over this threshold. Resistor R6 provides a path to remove collector to base leakage current $I_{co}$ from transistor T2 to thereby maintain it in an off condition when operating current is not flowing through R5. Resistor R4 is used to discharge the output of Noise Measuring Circuit 503 during quiet intervals. A Noise Measuring Circuit such as shown in FIG. 2 is acceptable; resistor R4 would then be selected to be large in comparison with the output impedance of amplifier 221.

Ringer 501 is shown having two intensity levels controlled in accordance with the state of relay RR. A ringer such as shown in FIG. 2 could be modified, as indicated, to perform the functions of ringer 501: oscillator 223 would be directly connected to amplifier 224 with the RD contact similarly located, and normally open relay contact RR — shunted by a further resistor — would be connected in series with resistor R3.

Throughout the figures, the ground symbol represents a local ground not metalically connected to a telephone office ground. Although a specific embodiment of this invention has been described, it will be understood that various modifications may be made without departing from the spirit of this invention.

What is claimed is:

1. A telephone set including means responsive to an incoming ringing signal for generating an audible alerting signal;
characterized by:
   a loudness control responsive to audible sounds, external to said telephone set and occurring prior to the arrival of the ringing signal, for establishing a threshold amplitude level of the audible alerting signal and responsive to audible sounds including the contribution of the audible alerting signal to the level of the audible sounds, external to said telephone set and occurring subsequent to the arrival of the ringing signal, for increasing the level of the audible alerting signal above the threshold level.

2. In a telephone set according to claim 1 wherein the loudness control comprises
   means for converting said audible sounds into converted signals proportional thereto; and
   means responsive to the average of said converted signals for regulating the loudness of the audible alerting signal.

3. In a telephone set according to claim 2 wherein the audible alerting signal occurs in bursts at a predetermined cadence and the regulating means includes means responsive to said converted signals average over a time interval of a plurality of the periods of the cadence; whereby the level of the audible alerting signal increases in response to its own contribution to the the level of audible sounds.

4. In a telephone set according to claim 1 wherein
   the telephone set includes a transmitting microphone for converting audible sounds into output signals and means for applying the output signals to a telephone communication path; and
   said loudness control includes means responsive to the output signals for regulating the loudness of the audible alerting signal.

5. In a telephone set according to claim 4 wherein the telephone set assumes an on-hook and an off-hook state and there is further included
   means responsive to the off-hook state of the telephone set for rendering said applying means operative and said regulating means inoperative; and
   means responsive to the on-hook state of the telephone set for rendering said regulating means operative and said applying means inoperative.

6. A telephone set including means responsive to an incoming ringing signal for generating an audible alerting signal;
characterized by:
   a loudness control responsive to audible sounds, external to said telephone set and occurring prior to the arrival of the ringing signal, for establishing a threshold amplitude level of the audible alerting signal; and
   means responsive to said ringing signal for rendering said loudness control unresponsive to the external audible sounds; whereby the amplitude level of the audible alerting signal established prior to the arrival of the ringing signal remains substantially constant subsequent to the arrival of the ringing signal.

7. A telephone set, having an off-hook and an on-hook state, including a transmitting microphone for converting audible sounds into output signals, and loudness control means responsive to signals for regulating the loudness of an audible alerting signal;
the improvement comprising:
   means responsive to the state of the telephone set for applying said output signals to a telephone communication path during the off-hook state and for applying said output signals to the loudness control means during the on-hook state.

8. A telephone set according to claim 7 wherein the applying means comprise switchhook contacts.

9. A telephone set according to claim 7 wherein said telephone set includes manually operable means for independently setting a minimum loudness level of said audible alerting signal.

10. A telephone set according to claim 7 wherein the loudness control means includes means for establishing an average amplitude lever of said output signals; and means responsive to the average amplitude level exceeding a predetermined threshold for increasing the loudness of said audible alerting signal.

* * * * *